(12) United States Patent
Hauser (10) Patent No.: US 10,372,803 B2
(45) Date of Patent: *Aug. 6, 2019

(54) SYSTEM, METHOD AND COMPUTER READABLE MEDIUM FOR BINDING AUTHORED CONTENT TO THE EVENTS USED TO GENERATE THE CONTENT

(71) Applicant: Oracle America, Inc., Redwood Shores, CA (US)

(72) Inventor: Robert R. Hauser, Frisco, TX (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/346,465

(22) Filed: Nov. 8, 2016

(65) Prior Publication Data

US 2017/0068652 A1 Mar. 9, 2017

Related U.S. Application Data

(63) Continuation of application No. 13/287,313, filed on Nov. 2, 2011, now Pat. No. 9,489,468, which is a
(Continued)

(51) Int. Cl.
*G06F 16/00* (2019.01)
*G06F 17/24* (2006.01)
(Continued)

(52) U.S. Cl.
CPC .......... *G06F 17/243* (2013.01); *G06F 3/0481* (2013.01); *G06F 3/0482* (2013.01);
(Continued)

(58) Field of Classification Search
CPC ......... G06F 17/30985; G06F 17/30864; G06F 17/30038; G06F 17/30053;
(Continued)

(56) References Cited

U.S. PATENT DOCUMENTS 5,754,659 A * 5/1998 Sprunk ................. H04L 9/3242
380/239
6,169,992 B1 * 1/2001 Beall ..................... G06F 16/951
(Continued)

OTHER PUBLICATIONS

U.S. Appl. No. 12/435,754, Final Office Action dated Feb. 14, 2012, 17 pages.
(Continued)

*Primary Examiner* — Srirama Channavajjala
(74) *Attorney, Agent, or Firm* — Kilpatrick Townsend & Stockton LLP (57) ABSTRACT

A web page that includes content form fields may be modified to include an event observer module and an authored content module. Events generated during the authoring of content by a user are recorded by the event observer module and sent to an event server with an InteractionID. The authored content module inserts hidden fields into the form fields that are updated with the InteractionID when content is submitted to the web server. The web server provides the InteractionID in a bind request to the event server. The event server binds the content to the events used to create the content in response to the request.

17 Claims, 7 Drawing Sheets

Related U.S. Application Data continuation of application No. 12/435,754, filed on May 5, 2009, now Pat. No. 9,507,870.

(51) Int. Cl.
| | |
|---|---|
| *G06F 3/0481* | (2013.01) |
| *G06F 3/0482* | (2013.01) |
| *G06F 16/335* | (2019.01) |
| *G06F 16/958* | (2019.01) |
| *G06F 16/901* | (2019.01) |
| *G06F 16/2455* | (2019.01) |
| *G06F 17/22* | (2006.01) |

(52) U.S. Cl.
CPC ...... *G06F 16/24568* (2019.01); *G06F 16/337* (2019.01); *G06F 16/9014* (2019.01); *G06F 16/958* (2019.01); *G06F 17/2247* (2013.01)

(58) Field of Classification Search
CPC ......... G06F 17/30017; G06F 17/30876; G06F 17/30997; G06F 16/337; G06F 16/958; G06F 16/9014; G06F 16/24568; G06F 16/90344; G06F 16/951; G06F 16/2785; G06F 16/2308; G06F 16/4387; G06F 16/7837; G06F 16/83; H04L 9/3236
See application file for complete search history.

(56) References Cited

U.S. PATENT DOCUMENTS

| | | | | |
|---|---|---|---|---|
| 6,460,058 | B2* | 10/2002 | Koppolu | G06F 17/30855 707/E17.013 |
| 6,792,607 | B1* | 9/2004 | Burd | G06F 17/30893 707/999.102 |
| 6,848,108 | B1 | 1/2005 | Caron | |
| 6,934,750 | B2 | 8/2005 | Hijikata et al. | |
| 6,993,506 | B2* | 1/2006 | Jain | G06Q 20/10 705/39 |
| 7,051,042 | B2 | 5/2006 | Krishnaprasad et al. | |
| 7,694,223 | B2 | 4/2010 | Corson | |
| 7,779,345 | B2 | 8/2010 | Topalov et al. | |
| 9,081,864 | B2* | 7/2015 | Meyler | G06F 16/958 |
| 9,489,468 | B2 | 11/2016 | Hauser | |
| 9,507,870 | B2 | 11/2016 | Hauser | |
| 2002/0107772 | A1* | 8/2002 | Jain | G06Q 20/10 705/37 |
| 2004/0162787 | A1* | 8/2004 | Madison | G06F 21/10 705/64 |
| 2004/0250241 | A1* | 12/2004 | O'Neil | G06F 16/958 717/118 |
| 2005/0257134 | A1* | 11/2005 | Goodman | G06F 17/243 715/226 |
| 2005/0257148 | A1 | 11/2005 | Goodman et al. | |
| 2006/0064500 | A1* | 3/2006 | Roth | H04L 29/06027 709/231 |
| 2006/0179404 | A1 | 8/2006 | Yolleck et al. | |
| 2009/0228474 | A1* | 9/2009 | Chiu | G06F 17/30516 |
| 2009/0259650 | A1 | 10/2009 | Schuil | |
| 2009/0298480 | A1 | 12/2009 | Khambete et al. | |
| 2010/0287209 | A1 | 11/2010 | Hauser | |
| 2011/0016123 | A1* | 1/2011 | Pandey | G06F 16/2308 707/737 |
| 2011/0209049 | A1* | 8/2011 | Ghosh | G06Q 10/06 715/236 |
| 2012/0047157 | A1 | 2/2012 | Hauser | |
| 2018/0336182 | A1* | 11/2018 | Lachmi | G06F 17/2785 |

OTHER PUBLICATIONS

U.S. Appl. No. 12/435,754, Final Office Action dated Aug. 13, 2013, 18 pages.
U.S. Appl. No. 12/435,754, Non-Final Office Action dated Oct. 12, 2011, 17 pages.
U.S. Appl. No. 12/435,754, Notice of Allowance dated Jul. 19, 2016, 10 pages.
U.S. Appl. No. 13/287,313, Advisory Action dated Jun. 21, 2013, 3 pages.
U.S. Appl. No. 13/287,313, Advisory Action dated Oct. 25, 2013, 3 pages.
U.S. Appl. No. 13/287,313, Advisory Action dated Jun. 14, 2012, 4 pages.
U.S. Appl. No. 13/287,313, Final Office Action dated Aug. 13, 2013, 19 pages.
U.S. Appl. No. 13/287,313, Final Office Action dated Mar. 30, 2012, 19 pages.
U.S. Appl. No. 13/287,313, Final Office Action dated Apr. 12, 2013, 21 pages.
U.S. Appl. No. 13/287,313, Non-Final Office Action dated Dec. 22, 2011, 16 pages.
U.S. Appl. No. 13/287,313, Non-Final Office Action dated Nov. 9, 2012, 20 pages.
U.S. Appl. No. 13/287,313, Notice of Allowance dated Jul. 6, 2016, 9 pages.
Mueller et al., Cheese: Tracking Mouse Movement Activity on Websites, a Tool for User Modeling, Conference on Human Factors in Computing Systems, CHI '01 extended abstracts on Human factors in computing systems, Seattle, Washington, Session: Short talks: of mice and measures, 2001, pp. 279-280.

* cited by examiner

SYSTEM, METHOD AND COMPUTER READABLE MEDIUM FOR BINDING AUTHORED CONTENT TO THE EVENTS USED TO GENERATE THE CONTENT

CROSS-REFERENCE TO RELATED APPLICATIONS

This application is a continuation of and claims priority from U.S. patent application Ser. No. 13/287,313 filed on Nov. 2, 2011, entitled SYSTEM, METHOD AND COMPUTER READABLE MEDIUM FOR BINDING AUTHORED CONTENT TO THE EVENTS USED TO GENERATE THE CONTENT, issued as U.S. Pat. No. 9,489,468 on Nov. 8, 2016, which is a continuation of and claims priority from U.S. patent application Ser. No. 12/435,754 filed on May 5, 2009, entitled SYSTEM, METHOD AND COMPUTER READABLE MEDIUM FOR BINDING AUTHORED CONTENT TO THE EVENTS USED TO GENERATE THE CONTENT; these applications are incorporated herein by reference in their entirety.

FIELD OF THE INVENTION

This invention relates to a system, method and computer readable medium for providing and processing user content generated in web pages.

BACKGROUND OF THE INVENTION

In many web based applications, users provide content through various prompts such as online forms etc. Data that is not processed at the time of content submission may be irrevocably lost.

What is required is a system, method and computer readable medium that preserves and binds data generated during a web page interaction.

SUMMARY OF THE INVENTION

In one aspect of the disclosure, there is provided a method for preserving information associated with an online content submission. The method comprises receiving an event stream created during authoring of content, storing the event stream in a data store, receiving data at least partially indicative of the content, creating an association between the data and the event stream, and storing the association.

In one aspect of the disclosure, there is provided a web server that is configured to generate a web page comprising web page content comprising at least one user entry element, an authored content module that records hidden data into the at least one user entry element, and an event observer module that records events generated when content is added to the at least one user entry element. The web server is further configured to provide the web page to a client browser.

In one aspect of the disclosure, there is provided a computer-readable medium comprising computer-executable instructions for execution by a processor, that, when executed, cause the processor to receive an identifier of an event stream, retrieve an event stream identified by the identifier, and process the event stream to determine at least one work metric for producing the event stream.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
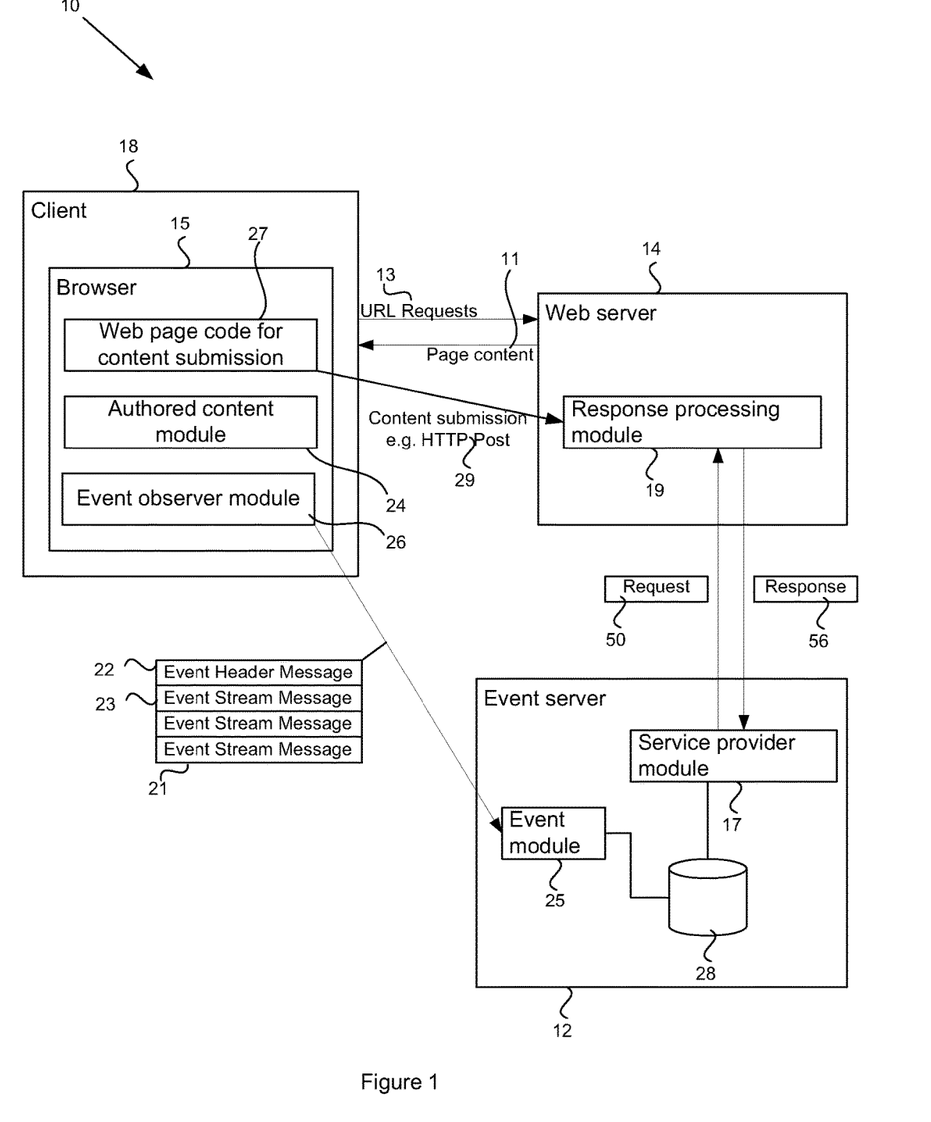
FIG. 1 illustrates a system for binding web generated content to events.

A system in accordance with an embodiment of the disclosure is depicted in FIG. 1. In the system 10, a client 18 provides web page requests 13 to a web server 14, in response to which, the web server 14 provides page content 11 for display in a browser 15 of the client 18. Typically, the web page 11 will include visible content and may include code 27 for content submission to the web server 14 via user entry elements such as an HTML form element. Many alternative user entry elements and content submissions methods will be known to a person skilled in the art. For example, AJAX methods may be used in place of the form elements. However, the specific content submission technique is considered irrelevant for the purposes of the present disclosure and all appropriate user entry elements and content submission methods are considered to be equivalent and are intended to be encompassed herein.

In accordance with an embodiment of the invention, the web server 14 is modified such that the web page content provided to the client 18 includes an event observer module 26 and an authored content module 24, both of which may be provided as appropriate code or scripts that run in the background of the client's browser 15. In one embodiment, code for providing the event observer module 26 and the authored content module 24 is provided to the web server 14 by a third party service, such as provided from an event stream server 12, described in greater detail below.

The event observer module 26 and the authored content module 24 may be provided as code embedded in a web page 11 from the web server 14. Alternatively or in addition, the Event Observer Module 26 and the Authored Content Module 24 may be provided as a link back to the web server 14 or a third party server, e.g. Event Stream server 12, for the resource containing the code which the web browser will fetch as part of loading the web page.

The event observer module 26 observes events generated in a user interaction with the web page 11 at the client 18. The event observer module 26 records events generated within the web browser 15, such as mouse clicks, mouse moves, text entries etc., and generates event streams 21 including an event header message 22 and one or more event stream messages 23.

The event observer module 26 provides the event streams 21 to the event stream server 12. The event stream server 12 includes an event module 25 and a suitable data store 28, which though shown in FIG. 1 within the event stream server 12, may also be provided as an offsite data store. The event stream server 12 also includes a service provider module 17 which interfaces with a response processing module 19 of the web server 14.

Figure 2:
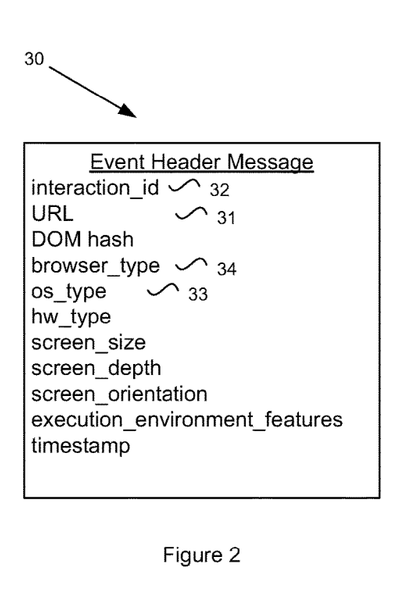
FIG. 2 illustrates an example of an event header message.
Figure 3:
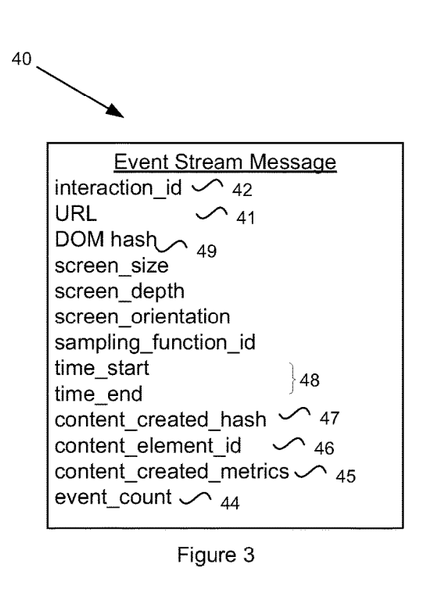
FIG. 3 illustrates an example of an event stream message.

An example of an event header message 30 is illustrated in FIG. 2 and an example of an event stream message 40 is illustrated in FIG. 3. The messages 30, 40 show a number of components that can be used. Primarily, an Interaction_ID 32, 42 uniquely identifies an interaction between the user and the web page 11 and aids to identify the particular event stream 21. The event header message 30 and the event stream message 40 may also identify the Uniform Resource Locator (URL) 31, 41. Fixed parameters such as the operating system 33 and browser type 34 may form part of the event header message 30. An event count field 44 may indicate the total number of unique events observed by the event observer module including those events not included in the event stream message 23 due to a current sampling function excluding them. Content creation parameters 45, 46, 47 to be described in more detail below may also be specified.

The event observer module 26 passes the event streams 21 to the event module 25 of the event stream server 12. In the embodiment illustrated in FIG. 1, the event streams 21 are provided directly to the event module 25. However, the event streams 21 may also be provided indirectly, e.g. via the web server 14.

The authored content module 24 processes the web page content and adds hidden form fields so that when user content is created, the events generated during the content creation can be associated with the content in a process to be described in greater detail below. In one embodiment, the authored content module 24 adds a hidden Interaction_ID field to form fields and the like. Additional hidden fields may include an event stream checkpoint a content element ID, or similar. An event stream checkpoint may be added to aid the event server in finding the right place in the event stream to get the content generated metrics of the content actually submitted and due to possibly inter event stream message "submission". A timestamp may be sufficient for this checkpoint. Since a single interaction (user using a web page) can have several successive form submissions, each with their own content, two things need to be established. Firstly, the accurate content summaries (i.e. accurate hash codes for the content actually submitted) can be established by making sure a message is sent to the event server when content is submitted. Next, the events observed (which are by now somewhere on the event server in the event stream) that were used to generate the content must be established. A timestamp or "event stream checkpoint" in the interaction can mark the point of submission so the event server can correlate earlier received events generating the content with the content submitted. Not all events occurring within a form field are relevant. Typically, only those events that led up to a particular submission of certain content are relevant. One common case is that a user fills out a form and clicks submit but the server indicates back to the client that some field is not complete or correct. The user then changes the value of just one field and submits the form successfully. Within the event stream on the event server, the checkpoints can be used to isolate the events that are responsible for the content in the final submission. In one embodiment, the system can force an event stream message at the time of form submission so that the event server will get correct content summaries (hashes).

During an interaction with the web page 11, a user enters content where appropriate, such as in the HTML form elements described above. During content creation, various events are generated and recorded by the event observer module 26. Events may include mouse clicks, mouse moves, key strokes etc. At some stage during the user interaction, the client will submit content 29, e.g. via an HTML form element field, to the web server 14. When the content is submitted, the hidden form fields, such as the Interaction_ID field, may be dynamically updated with an Interaction_ID from the event observer module 26. Thus the content submission carries additional elements. Simultaneous with the content submission, an event stream message 21 corresponding to the content submission may be generated and sent to the event module 25. The event stream message 21 will typically include the Interaction_ID, an event stream of the events generated, as well as content creation parameters such as a content element ID 46, content metrics 45 and cryptographic (one way) hash of the content 47 of the form fields, termed a content strong hash herein.

Figure 4:
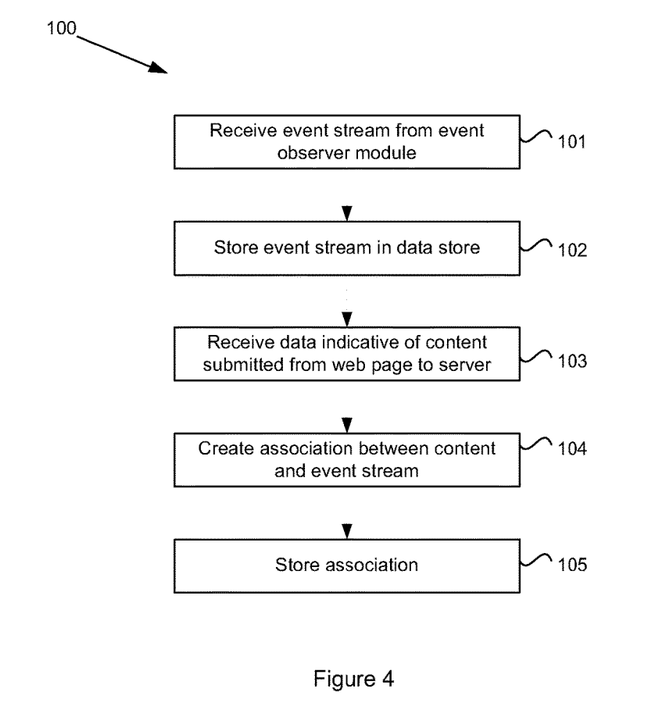
FIG. 4 illustrates a method for authored content binding in accordance with an embodiment of the disclosure.

A method for creating an association between the submitted content and the events corresponding to the submitted content will now be described with reference to the flowchart 100 of FIG. 4. At step 101, the event module 25 receives an event stream 21 and stores the event stream in the data store 28 (step 102). At step 103, the service provider module 17 of the event stream server receives the data that indicates the content. The data may be indicated by a common identifier, such as the Interaction_ID, content hash or other suitable identifier. Once both the event stream and the content data or content summaries (e.g. strong hashes) have been received, the event stream server 12 creates an association between the event stream and the content summary (step 104), such as a bind code, and stores the association in the data store 105.

Figure 5:
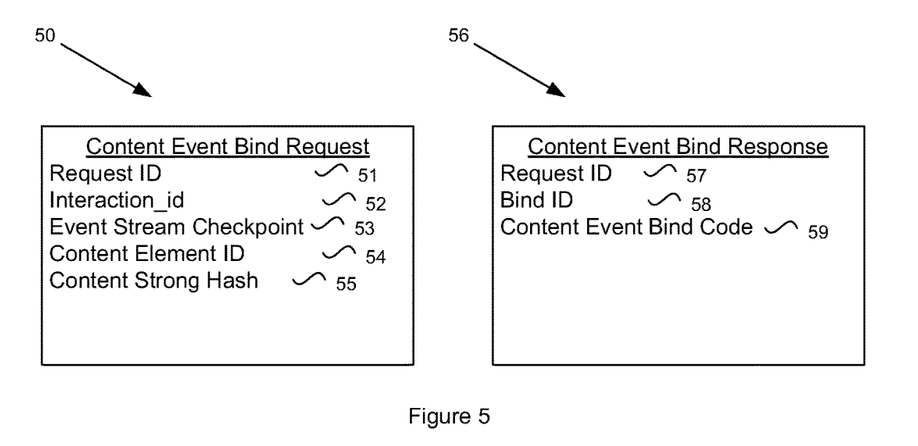
FIG. 5 illustrates examples of a content bind request and a content bind response.

A bind operation may be initiated from the web server 14 in response to the web server 14 receiving the content submission 29. In particular, the response processing module 19 requests the service provider module 17 to bind the content to the events that were observed during the authoring of that content. Data indicating the content 29 may be provided to the service provider module 17 in a content event bind request. A content event bind request 50 sent from the web server 14 is represented in FIG. 5. The bind request 50 includes a RequestID 51 and may identify the events by the InteractionID 52, EventStreamCheckpoint 53 and ContentElementID 54. The ContentElementID 54 can be based on a property (e.g. name attribute) or it could be generated and sent in hidden form fields to the web server or based on a known algorithm shared by the authored content module 24 and the web server 14. The content itself may be represented by content summary such as a cryptographic (one-way) hash, e.g. ContentStrongHash 55 so that the event stream server 12 need not be exposed to the content sent from the client to the web server 14.

A content event bind response 56 may be sent from the event stream server 12 to the web server 14. An example of the content event bind response 56 is also illustrated in FIG. 5 and may include the RequestID 57, a BindID 58 generated by the event stream server 12, and a ContentEventBindCode 59. The ContentEventBindCode 59 may be a cryptographic (one way) hash of a secret concatenated to the ContentStrongHash 55. The secret may be any hard to derive identifier associated with the event stream for the content. In one embodiment, the secret may be a cryptographic (one-way) hash of the relevant events of the event stream.

Figure 6:
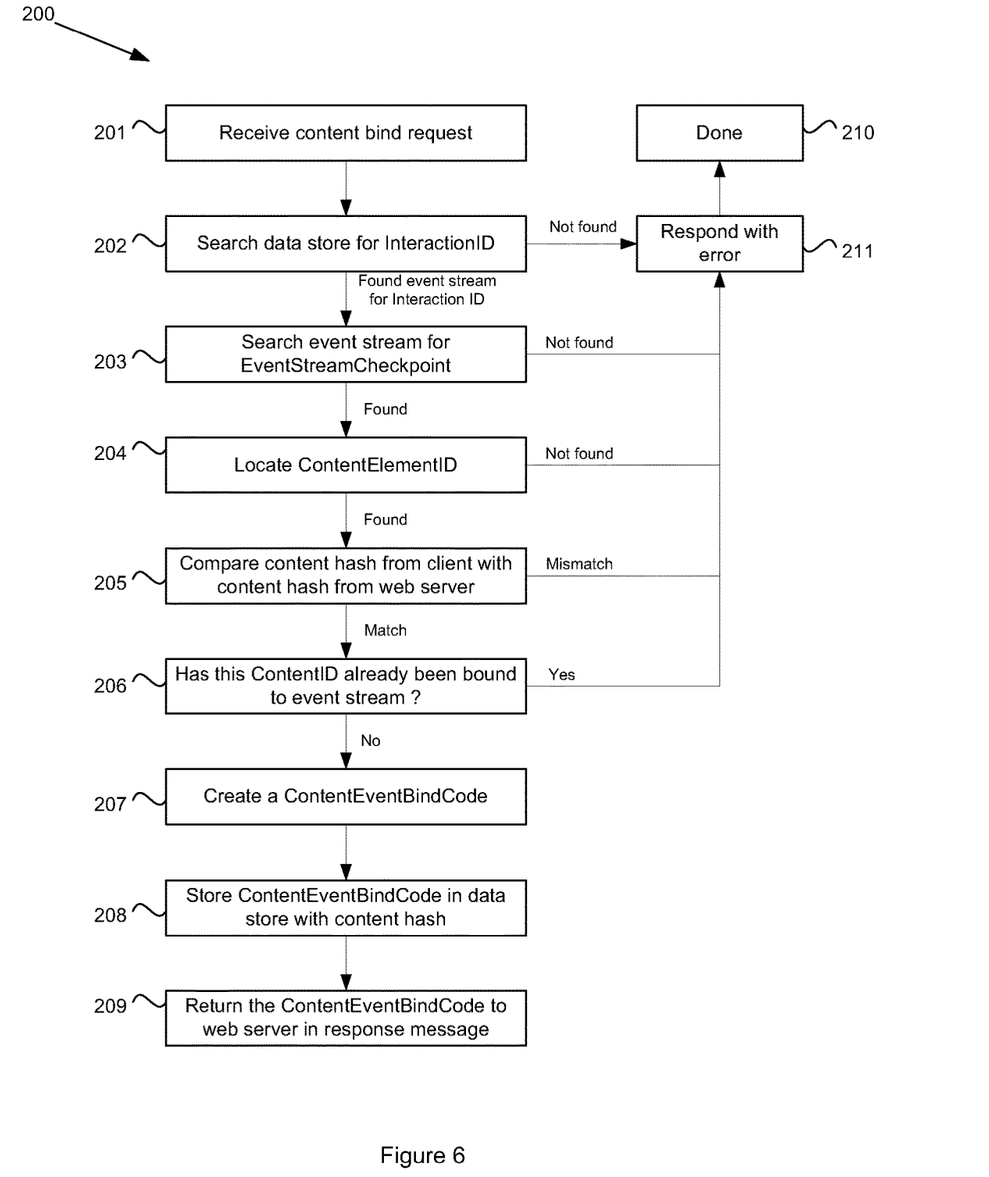
FIG. 6 illustrates a process for processing a bind request.

The authored content is bound to the event stream in the event stream server 12. A binding process 200 is depicted in FIG. 6. At step 201, the event stream server 12 receives a bind request, for example in the form of a bind request message 50 of FIG. 5. The event stream server 12 then searches available event streams of the data store 28 using the InteractionID as a search key. If the InteractionID is not found in the data store 28, an error message 211 is provided and the process finishes 210. If an event stream with the required InteractionID is found in the data store 28, then the retrieved event stream may be searched for a matching event stream checkpoint (e.g. timestamp) indicated in the request message 50, and if found, the event stream is searched for a matching ContentElementID field 46 (FIG. 3). At step 205, the content hash 55 received from the web server 14 in the bind request 50 is checked against a content hash 47 provided from the browser to the event server 12. Typically, the authored content module is updating these in the browser and the event observer module is putting them in the event stream messages. At step 206, the data store 28 is searched to ensure that the content element ID is not already bound to an event stream. It will be appreciated that the search and verification of the event stream message may use a greater or lesser number of the fields described above and that the order of verification may be altered appropriately. Assuming that the necessary fields match, then it can be determined that the correct event stream message has been retrieved from the data store and binding of the event stream may then occur. In one embodiment, matching of event streams may use the event stream checkpoints described above. Once the location in the event stream is found (event stream checkpoint/timestamp) then backtracking through the event stream messages occurs to look at both the content_element_id content metrics (summaries of authored content for that particular form field/DOM element) and the events observed in and around that DOM element. This process isolates the events (the "work") done to generate a particular piece of content.

At step 207, a content event bind code is created. In one embodiment, the content event bind code is created as a hash code of the relevant events, e.g. the events generated in producing the content. The event stream hash may be combined with the authored content hash, derived either from the event stream message or the bind request message. The event stream hash and authored content hash may be combined by a cryptographic (one way) hash to create the content event bind code, though other methods for creating the content event bind code will be apparent to a person skilled in the art. In one specific example, the content can be represented by a one-way hash and the events can be represented by their hash or a unique ID. Thus, where CONCAT is concatenation and HASH can be a normal hash and SHASH needs to be a strong cryptographic hash, the bind code can be represented as:

BindCode=SHASH(CONCAT(SHASH(Content), HASH (Events))).

The HASH(Events) represents the hash of the "events observed within the event stream that were relevant in generating the content". In the bind code the HASH(Events) could be replaced by a unique id.

It should be noted, that there may be multiple content_created hash values in each event stream message. In particular, each DOM element that can have user entered content may have a unique content hash value created to represent the content of that DOM element.

Once the content event bind code has been generated, the data store may be updated and a bind response message 56 may be sent from the event stream server 12 to the web server 14 with the ContentEventBindCode field 59 appropriately completed.

Through the bind request and binding procedures described above, the authored content may be bound to the events that generated the content. Once the content has been bound to the event stream, various new processes and services may be performed on the bound content.

In one embodiment, an event stream bound to the authored content may be analyzed to determine whether the user at the browser is a human user or not. For example, a web server 14 may send a request to the event stream server with an interactionID, BindID and/or ContentEventBindCode. The identifiers sent from the web server 14 allow the event stream server 12 to identify and retrieve the appropriate record in the data store 28. The event stream associated with the identifier may then be processed to determine an event generator type (e.g. human, non-human etc), such as by comparing the event stream with stored event streams having a known event generator type. Further description for determining the event generator type is provided in the Applicant's co-pending U.S. patent application Ser. No. 13/287,313 the contents of which are explicitly incorporated herein by reference. Another interesting use of the above described system is that cut-and-paste entry of content (e.g. into form fields) is easily detected by the observed events surrounding the form submission. In addition "auto-filled" forms that some browsers try to perform on behalf of their users can also be detected. A web server (using the event server for analysis) can make use of this distinction. If all fields submitted are cut-and-paste (or auto-filled) then the form submission can be rejected perhaps with a message "Please manually enter the values for at least two form fields".

One service may include determining the amount of work done to create the content. Work may be measured by the number of user interface events generated and/or the time taken to create the content. For example, the time taken to complete the form fields of the content 29 may be determined from timestamps 48 (FIG. 3) of the event stream messages. The work done may be determined by the event server in response to a request received from a web server or similar interested party. The actual content need not be sent to the event server 12, but a summary of the content may be sent (e.g. one-way hash) and the amount of authored content may be determined from the content_created_metrics field 45 of the event stream message 23 For textual content the metrics may be: the number of characters in the field, the number of words/tokens in the field, an approximate hash of the field, complexity measures (e.g. a field value's "compressibility" as measured by the difference in the number of bits used to store the value versus the number of bits if the value is run through a compression algorithm on the browser. For other types of content (e.g. graphical entry like drawing/painting pixels) the metrics can be a count of non-default valued pixels (i.e. number of changed pixels), number of draw/paint "strokes" as computed on the client browser, and complexity (e.g. compressibility size compare). The work taken may be compared to what amount of work is typically done in generating the same amount of content, for example by comparison with records within the data store 28 that were generated through a known interaction with the web page 11. Rapidly produced content may indicate that the client 18 is a non-human client. The work measures (and the event generator analysis) can therefore be used by the web server 14 to decide whether to add a CAPTCHA (Completely Automated Public Turing test to tell Computers and Humans Apart), or other human response test to the form and to re-request the form data. Systems and methods for dynamically adding a human response test are described in the Applicant's co-pending U.S. patent application Ser. No. 12/435,754, the entire contents of which are specifically incorporated herein by reference.

In one embodiment, the event server 12 may receive a request to check a bind code. The request may specify some or all of a BindID, ContentEventBindCode and a ContentStrongHash from which the event server 12 may determine whether a record matching these criteria exists in the data store. This service may provide a check for web servers and third parties to verify whether a ContentEventBindCode is genuine (i.e. human generated) or has been fraudulently generated.

One service generates a token that can accompany the content wherever it travels and any recipient can then request the new services for that content by sending an appropriate request to the event server 12. For example, an arbitrary node receiving some content with a token having an associated ContentEventBindCode may compute a one-way hash of the content (using the same algorithm that was used during content creation) and send the result along with the ContentEventBindCode to the event stream server 12. The ContentEventBindCode may also include within itself an indicator of which algorithm to be used to encode the content summary. The event stream server 12 may then generate a CheckBindCodeResponse validation that the code does indeed match the content, or if a malicious node switched the code or altered the content then the validation would fail.

Figure 7:
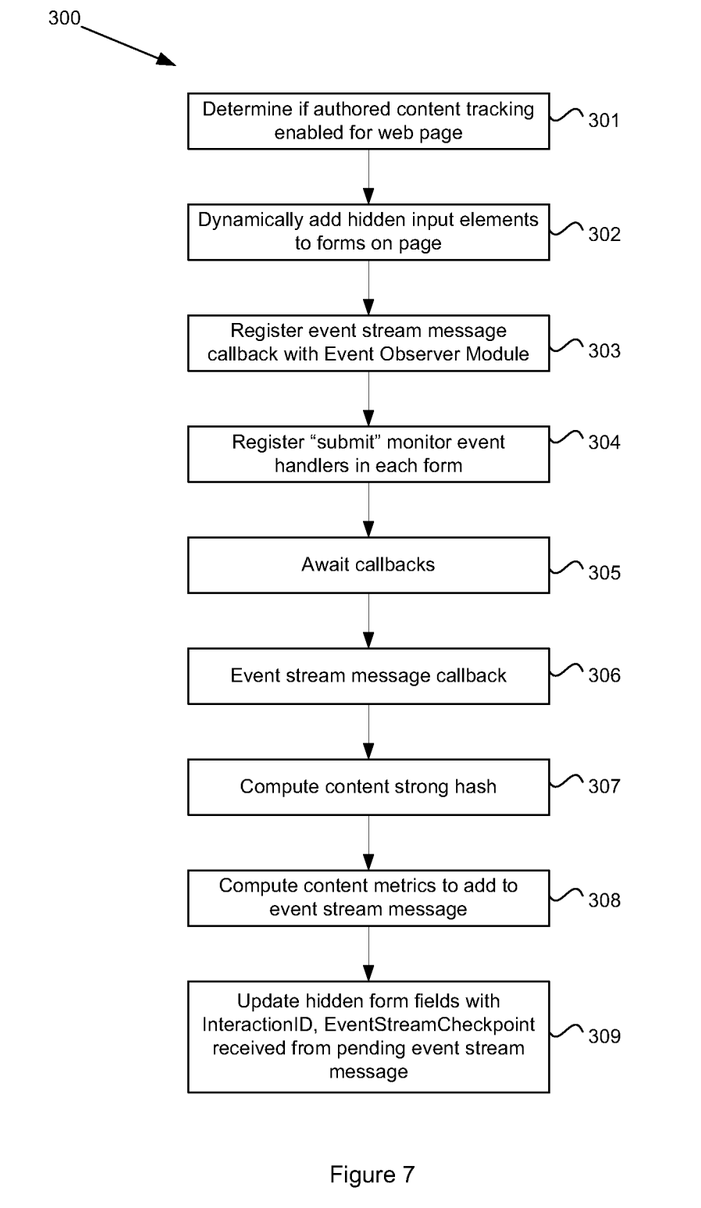
FIG. 7 illustrates a process of an authored content module.
Figure 8:
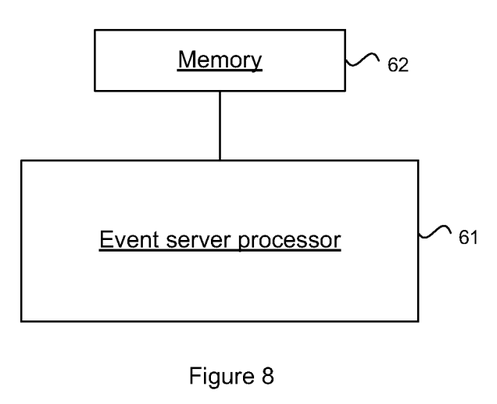
FIG. 8 illustrates a processor and memory of an event server.

The operation of the authored content module 24 will now be described with reference to the flowchart 300 of FIG. 7. The authored content module 24 is provided within the web page content 11 in a manner that is invisible to the user. When a user interfaces with a web page 11, in a first step 301, the authored content module 24 determines whether authored content tracking is enabled for that web page. If enabled, the authored content module 24 then dynamically adds hidden input elements to forms or other user content areas on the page (step 302) as will be described in greater detail below. The authored content module 24 then registers event stream message callback with the event observer module 26 (step 303) and registers a "submit" function monitor with event handlers in each form (step 304). At this stage, the authored content module is set to await callbacks (step 305).

Periodically, the event observer module 26 generates event stream messages, which triggers the callback 306 to the authored content module 24. The authored content module 24 then computes a strong hash (one way) for each content area (e.g. form field) (step 307) which is added to the event stream message generated by the event observer module 26. The authored content module 24 also creates content metrics (step 308) which are also added to the event stream message 23, 40. The authored content module 24 then receives InteractionID and EventStreamCheckpoint values from the event observer module 26 and updates the hidden form fields with these values (step 309). The event observer module 26 may or may not send the pending event stream message at this point.

An example for modifying the web page content will now be provided. The following code is typical HTML code for providing submission of comments on a common blogging platform:

```
<form action="http://192.168.1.107/wordpress/wp-comments-post.php" method="post" id="commentform">
<p><input name="author" id="author" value="" size="22" tabindex="1" type="text">
<label for="author"><small>Name </small></label></p>
<p><input name="email" id="email" value="" size="22" tabindex="2" type="text">
<label for="email"><small>Mail (will not be published) </small></label></p>
<p><input name="url" id="url" value="" size="22" tabindex="3" type="text">
<label for="url"><small>Website</small></label></p>
<p><textarea name="comment" id="comment" cols="100" rows="10" tabindex="4"></textarea></p>
<p><input name="submit" id="submit" tabindex="5" value="Submit Comment" type="submit">
<input name="comment_post_ID" value="1" type="hidden">
</p>
</form>
```

The blogging platform is provided as an example of an application that routinely enables a user to enter and submit content to a web server. In a client interaction, a user has entered the text "zzzzzzz" in the comment field and clicked submit. This interaction would typically be represented by the following transmission:

```
POST /wordpress/wp-comments-post.php HTTP/1.1
Host: 192.168.1.107
User-Agent: Mozilla/5.0 (Macintosh; U; Intel Mac OS X; en-US; rv:1.8.1.16)
Gecko/20080702 Firefox/2.0.0.16
Accept: text/xml,application/xml,application/xhtml+xml,text/html;q=0.9,text/plain;
q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Content-Type: application/x-www-form-urlencoded
Content-Length: 75
author=&email=&url=&comment=zzzzzzz&submit=Submit+Comment&comment_post_ID=1
```

In accordance with an embodiment of the invention, the authored content module 24 can use the function below within the web page to add a hidden input field to the form that will be updated dynamically. The example function below discovers the form by id but forms can also be discovered by traversing the structure of the Document Object Model (DOM).

```
function insertformtracker( ) {
    // Insert a hidden form element to send an
    // INTERACTION_ID value back to the web-server.
    // The INTERACTION_ID can be used to identify the event
    // stream at an event stream server.
    //
    // The INTERACTION_ID (along with the form field ID and
    // the one-way hash of the content) can be used to get a
    // ContentEventBindCode with allows an authored chunk of
    // content to be associated with the relevant events
    // generated during content creation.
    //
    var x = document.getElementById('commentform');
    if (!!x) {
        var y = document.createElement('input');
        y.type = "hidden";
        y.name = "interaction_ID";
        // y.value will be updated live to be the actual
        // interaction ID used in the event observer module
        y.value = "55555";
```

```
    x.appendChild(y);
  };
};
```

The "insert form tracker" function locates a form element and registers the "interaction_ID" field as a hidden field. Not shown is an additional hidden field for the EventStream-Checkpoint (i.e. timestamp) which is added in the same manner. When the user submits the text "zzzzzzz" in the comment field as described previously, the authored content module 24 updates the 'value' property of the interaction_ID field with the actual interaction_ID from the event observer module 26. Accordingly, the transmission appears as follows:

```
POST /wordpress/wp-comments-post.php HTTP/1.1
Host: 192.168.1.107
User-Agent: Mozilla/5.0 (Macintosh; U; Intel Mac OS X; en-US;
rv:1.8.1.16)
Gecko/20080702 Firefox/2.0.0.16
Accept:
text/xml,application/xml,application/xhtml+xml,text/html;q=0.9,text/plain;
q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Content-Type: application/x-www-form-urlencoded
Content-Length: 75
author=&email=&url=&comment=zzzzzzz&submit=Submit+Comment&
comment_post_ID=1&interaction_ID=311920
```

In this transmission, the value of the interaction_ID has been included and is therefore associated with the content submission. Additionally the EventStreamCheckpoint (e.g. timestamp) is provided to the web server. The interaction_ID, EventStreamCheckpoint, and content summaries (re-computed on the web server) can be provided to the event stream server 12 for binding of the content to the events that were used to create the content.

In the above described embodiments, the event stream server 12 has been described as a third party service entity separate from the web server 14. In these embodiments, the code installed at the web server 14 may include a functionality that would enable the third party to dynamically enable and disable the authored content monitoring, e.g. turn it off in real time if the web server's account for receiving the described services reaches $0. In alternative embodiments, the event stream server 12 may be incorporated within the web server 14 such that the authored content 29 and the event streams 21 are received and processed within the web server 14.

The ContentEventBindCode can optionally include an unencrypted work score. Since a malicious node could alter this score when passing on the content with its ContentEventBindCode it would only be treated as a hint by a non-malicious node and so eventual checking with the server would still be advised.

The content 29 communicated back to the web server 14 may include a time window during which the web server 14 must request the bind operation. If a time window is provided and the bind request is not within that window then an error will be returned.

In one embodiment, the ContentEventBindCode may also embed a duration so that it "expires" after a certain amount of time and no longer can be used to receive services for the associated content.

Figure 9:
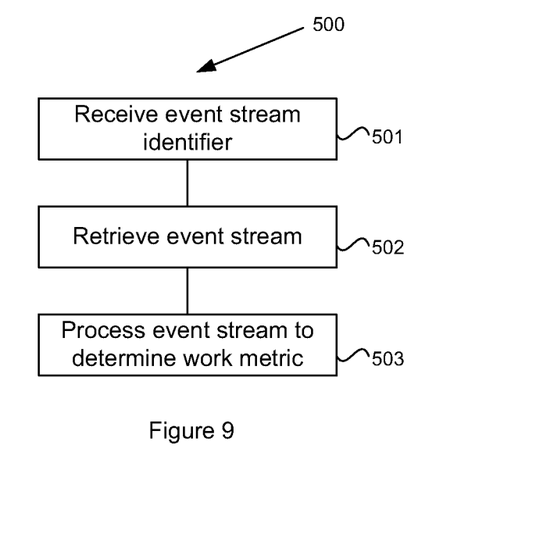
FIG. 9 illustrates an instruction set that may be executed on the processor and memory of FIG. 8.
Figure 10:
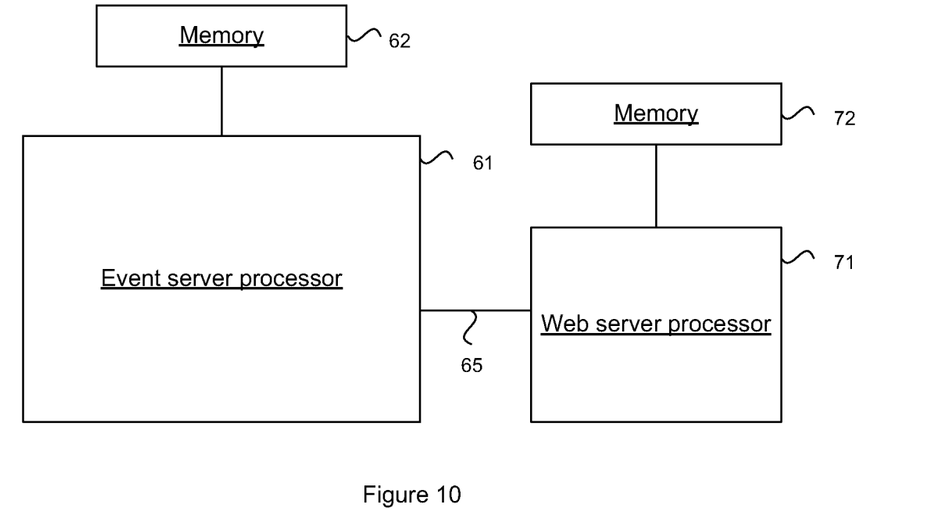
FIG. 10 illustrates the processor and memory of FIG. 8 in association with a processor and memory of a web server.

In one embodiment, the event server 12 may include a processor 61 operatively associated with a memory 62 as shown in FIG. 9. The memory 62 may store instructions that are executable on the processor 61. In addition, the memory 62 may provide elements of the data store 28. An instruction set 500 that may be executed on the event server processor 61 is depicted in the flowchart of FIG. 10. Specifically, when executed, the instruction set 500 allows the processor to receive an event stream identifier 501, retrieve an event stream identified by the event stream identifier 502, such as from the memory 62 or data store 28, and then process the retrieved event stream to determine at least one work metric in respect of the event stream (step 503). The event stream identifier may be an Interaction_ID, ContentEventBindCode etc and may be received from a second processor, such as a processor 71 of a web server shown in FIG. 11, that may also be operatively associated with a memory 72. The second processor 71 may provide the event stream identifier through a suitable communications link 65 in a service request, such as a request for any of the event stream services described above.

An advantage of the above described embodiments includes that the measurement of the work metrics and generation of the tokens can be performed in a way that is transparent to the user, with minimal modification of normal web pages. The various embodiments provide a convenient method by which the work effort to create some content can be measured and subsequently associated with that content. A persistent identifier that is correlated to a chunk of content can be generated and used to identify the original event generator type (human, computer). The persistent ID allows re-identifying the event streams for created content which further enables new services to be provided in relation to that content.

Although nothing in this invention prohibits the event stream from carrying enough information to reconstruct the actual content that is created on the client, the intended use is to abstract only what is necessary of the events and of the content to provide the services. In the typical case, the client (content creator) and web server (content receiver) are the only ones that have the created content. Content privacy can be maintained with the event server embodiment by (i) using strong cryptographic hashes (one-way) for content on the client and web server (ii) using sufficiently abstract content creation metrics e.g. the number of characters (in a text field) could be further abstracted to just specify ranges . . . 1-10 characters, 10-100 characters, 100-500 characters, etc (this further abstraction would still allow approximate work measures to be computed per amount of content) and (iii) the events can be abstracted as well e.g. a keydown event may be reported within the event stream but not the actual key pressed.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   receiving a data bind request to bind content;
   searching for an event stream data associated with an interaction identifier (ID) stored in a data store, responsive to receiving the data bind request, the interaction ID corresponding a particular interaction session associated with a user device and a webpage, wherein the event stream data includes an identifier of a webpage and characterize one or more events occurring during authoring of the content;
   determining whether the search resulted in detection of the event stream data associated with the interaction ID;
   when it is determined that search did not result in detection of the event stream data associated with the interaction ID:
      generating an error response to the data bind request; and
      outputting the error response; and
   when it is determined that search resulted in detection of the event stream data associated with the interaction ID:
      comparing at least one content item of the data bind request to at least one content item of the event stream data, wherein the at least one content item of the data bind request and the at least one content item of the event stream data include a content element identifier that identifies a location of authored content;
      determining whether a result of the comparison is indicative of a match between the at least one content item of the data bind request and the at least one content item of the event stream data; and
      when it is determined that the result of the comparison is not indicative of the match between the at least one content item of the data bind request and the at least one content item of the event stream data:
         creating a content event bind code based on the event stream data that is distinct from the content and an authored content hash derived from the content.

2. The method of claim 1, wherein the searching for the event stream data further comprises using the interaction ID identifying the content as a search key to perform the searching.

3. The method of claim 2, wherein if the interaction ID is found in the data store, then retrieving and searching the event stream data for an event stream checkpoint timestamp that is indicative of the data bind request.

4. The method of claim 1, wherein the creating the content event bind code based on the event stream data and the authored content hash derived from the content comprises:
   generating the authored content hash based on the content using a one-way hashing technique;
   generating a hash derived from at least one event of an event stream; and
   generating a cryptographic hash based on a combination of the authored content hash and the hash derived from the at least one event of the event stream.

5. The method of claim 4, wherein the cryptographic hash is based on at least one of the event stream data and the data bind request.

6. The method of claim 1, further comprising:
   detecting an auto-fill operation performed on a submitted form data; and rejecting the submitted form data for including invalid content.

7. The method of claim 1, wherein each of the one or more events includes a mouse move or text entry.

8. A method, comprising:
   determining that authored content tracking is enabled for a user interface
   subsequent to the determination that authored tracking is enabled for the user interface, adding one or more hidden input elements to one or more forms included on the user interface;
   registering an event stream message callback function with the user interface, the event stream message callback function being configured to be triggered when an event stream message is generated responsive to received content;
   receiving an interaction identifier (ID) identifying user-submitted content; and
   updating the one or more hidden input elements based on the received interaction ID, wherein each updated hidden input element of the updated one or more hidden input elements is configured to, when triggered, transmit the interaction ID in a communication corresponding to a request for bind code configured to bind event stream data and the user-submitted content, wherein, when the event stream message callback function is triggered, a callback message is transmitted to an authored content module which computes a hash value for at least one content area of the user interface, wherein the event stream data includes an identifier of a webpage and characterize one or more events occurring during authoring of the content.

9. The method of claim 8, wherein the user interface is a web page.

10. The method of claim 8, further comprising:
    adding the computed hash value to the event stream message.

11. The method of claim 8, wherein the hidden input elements added to the forms on the user interface are updated automatically.

12. A non-transitory computer readable storage medium comprising instructions that when executed cause a processor to perform:
    receiving a data bind request to bind content;
    searching for an event stream data associated with an interaction identifier (ID) stored in a data store, responsive to receiving the data bind request, the interaction ID corresponding a particular interaction session associated with a user device and a webpage, wherein the event stream data includes an identifier of a webpage and characterize one or more events occurring during authoring of the content;
    determining whether the search resulted in detection of the event stream data associated with the interaction ID;
    when it is determined that search did not result in detection of the event stream data associated with the interaction ID:

generating an error response to the data bind request; and outputting the error response; and when it is determined that search resulted in detection of the event stream data associated with the interaction ID:

comparing at least one content item of the data bind request to at least one content item of the event stream data, wherein the at least one content item of the data bind request and the at least one content item of the event stream data include a content element identifier that identifies a location of authored content;

determining whether a result of the comparison is indicative of a match between the at least one content item of the data bind request and the at least one content item of the event stream data; and when it is determined that the result of the comparison is not indicative of the match between the at least one content item of the data bind request and the at least one content item of the event stream data:

creating a content event bind code based on the event stream data that is distinct from the content and an authored content hash derived from the content.

13. The non-transitory computer readable storage medium of claim 12, wherein the searching for the event stream data further comprises using the interaction ID identifying the content as a search key to perform the searching.

14. The non-transitory computer readable storage medium of claim 13, wherein if the interaction ID is found in the data store, then retrieving and searching the event stream data for an event stream checkpoint timestamp that is indicative of the data bind request.

15. The non-transitory computer readable storage medium of claim 12, wherein the creating the content event bind code based on the event stream data and the authored content hash derived from the content comprises:

generating the authored content hash based on the content using a one-way hashing technique;

generating a hash derived from at least one event of an event stream; and generating a cryptographic hash based on a combination of the authored content hash and the hash derived from the at least one event of the event stream.

16. The non-transitory computer readable storage medium of claim 15, wherein the cryptographic hash is based on at least one of the event stream data and the data bind request.

17. The non-transitory computer readable storage medium of claim 12, wherein the processor is further configured to perform:

detecting an auto-fill operation performed on a submitted form data; and rejecting the submitted form data for including invalid content.

* * * * *